US007656351B1

(12) United States Patent
Rao et al.

(10) Patent No.: US 7,656,351 B1
(45) Date of Patent: Feb. 2, 2010

(54) METHOD OF DESIGNING A LOW COST MULTIBEAM PHASED ARRAY ANTENNA FOR COMMUNICATING WITH GEOSTATIONARY SATELLITES

(75) Inventors: Jaganmohan B. L. Rao, College Park, MD (US); Rashmi Mital, Lorton, VA (US); Dharmesh P. Patel, Fulton, MD (US); Mark G. Parent, Port Tobacco, MD (US); Gregory C. Tavik, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/969,390

(22) Filed: Jan. 4, 2008

Related U.S. Application Data

(60) Provisional application No. 60/883,562, filed on Jan. 5, 2007.

(51) Int. Cl.
*H01Q 3/00* (2006.01)
*H01Q 3/34* (2006.01)
(52) U.S. Cl. ....................................... 342/359; 342/375
(58) Field of Classification Search ................ 342/356, 342/359, 371, 372, 375
See application file for complete search history.

(56) References Cited

U.S. PATENT DOCUMENTS 4,458,247 A * 7/1984 Amitay ........................ 342/368

OTHER PUBLICATIONS

Amitay et al, 'Narrow Multibeam Satellite Ground Station Antenna Employing a Linear Array with a Geosynchronous Arc Coverage of 60—Part I:Theory,' IEEE Trans on Antennas and Propagation, vol. AP-30 No. 6, Nov. 1982, pp. 1063-1067.*
Gans et al, 'Narrow Multibeam Satellite Ground Station Antenna Employing a Linear Array with a Geosynchronous Arc Coverage of 60—Part II: Antenna Design,' IEEE Trans on Antennas and Propagation, vol. AP-31 No. 6, Nov. 1983, pp. 966-972.*
Amitay. N and Gans, M. G., "Narrow Multibeam Satellite Ground Station Antenna Employing a Linear Array With a Geosynchronous Are Coverage of 60 - - - Part I:Theory", IEEE Transactions on Antennas and Propagation, vol. AP-30, No. 6, Nov. 1982.
Gans, M.G. and Amitay, N., "Narrow Multibeam Satellite Ground Station Antenna Employing a Linear Array With a Geosynchronous are Coverage of 60, PartII: Antenna Design", IEE Transactions on Antennas and Propagation, vol. AP-31, No. 6., Nov. 1983.

* cited by examiner

*Primary Examiner*—Gregory C Issing
(74) *Attorney, Agent, or Firm*—John J. Karasek; Suresh Koshy

(57) ABSTRACT

A method for electronically scanning a predetermined geostationary orbital arc segment around the earth with an antenna system. The antenna system includes a planar array. A number of fixed electronic squints is selected. Lengths of the total plurality of fixed delay line lengths are generated for the planar array based on the number of fixed electronic squints. All of the antenna elements in the planar array for the mobile earth station are fitted with the generated lengths. The orbital arc segment is electronically scanned with a single linear scan with the planar array. This method is extendable to the case of multiple beams by adding additional phase shifters at each column and keeping the number of fixed line lengths the same, regardless of the number of additional beams.

5 Claims, 11 Drawing Sheets

METHOD OF DESIGNING A LOW COST MULTIBEAM PHASED ARRAY ANTENNA FOR COMMUNICATING WITH GEOSTATIONARY SATELLITES

CROSS-REFERENCE TO RELATED APPLICATION

This application claims priority to, U.S. Provisional Patent Application Ser. No. 60/883,562, entitled "MULTIBEAM GEOSTATIONARY SATELLITE COMMUNICATIONS ARRAY" to Rao et al.

TECHNICAL FIELD

The invention relates generally to a method of designing an antenna array, and more particularly, to a method for designing a planar array antenna for scanning a beam in one-dimension to communicate with one or more geostationary satellites.

DESCRIPTION OF RELATED ART

The users of communication satellite services use a fixed or mobile earth station, located on the ground, on the sea, or in the air to communicate with a satellite. Often, a user (e.g., a ship) needs to communicate with several satellites simultaneously. A separate antenna is used to communicate with each satellite. A planar array antenna (i.e., one made up of N×M elements) can in principle be used to communicate with several satellites simultaneously by generating multiple independent beams and scanning them in the two orthogonal planes. However, it is very expensive to implement this antenna because NM (N×M) phase shifters are needed for each beam to scan in the two planes. For a special case of satellites in a geostationary ("GEO") orbit, the scanning requirement in the vertical plane is relatively small and is a function of the earth station antenna location given in terms of the latitude and the longitude. Amitay and Gans realized this fact and suggested simpler antenna array configurations using a variable squint, which depends on the earth station location, in one plane and beam scanning in the other plane using phase shifters at each column rather than at each element. See, e.g., N. Amitay and M. J. Gans, "*Narrow Multibeam Satellite Ground Station Antenna Employing a Linear Array with a Geosynchronous Arc Coverage of 60°—Part I: Theory*", IEEE Transactions on Antennas and Propagation, Vol. AP-30, No. 6, pp. 1063-1067, November 1982, incorporated herein by reference; and M. J. Gans and N. Amitay, "*Narrow Multibeam Satellite Ground Station Antenna Array with a Geosynchronous Arc Coverage of 60°—Part II: Antenna Design*", IEEE Transactions on Antennas and Propagation, Vol. AP-31, No. 6, pp. 966-972, November 1983, incorporated herein by reference.

However, achieving variable squints is akin to having a limited scan capability, which still calls for a new phase adjustment at each element whenever a mobile earth station's (e.g., ship's) location changes. This still requires a complicated array configuration. The antenna designs proposed by Amitay and Gans are applicable only to fixed (not mobile) earth stations.

SUMMARY OF THE INVENTION

An embodiment of the invention includes a method for electronically scanning a predetermined geostationary orbital arc segment around the earth with a planar array antenna system that uses a single linear scan while the antenna system is disposed at a mobile earth station on the surface of the earth at a current latitude of a plurality of latitudes and a current longitude of a plurality of longitudes. The antenna system is represented by a directional cosine coordinate system (X, Y, Z). The directional cosine coordinate system comprises a cardinal plane (X-Z Plane). The planar array comprises N rows and M columns. The planar array comprises N×M antenna elements. The antenna system comprises a total plurality of fixed delay line lengths connected to each antenna element of the plurality of N×M antenna elements with each fixed delay line length of the N corresponding fixed delay line lengths disposed along the columns. The plurality of fixed delay line lengths corresponds to at least one fixed electronic squint. The planar array comprises M phase shifters, each phase shifter being connected to a respective column. The planar array is oriented in a terrestrial surface coordinate system of the earth represented by $(X_e, Y_e, Z_e)$, which is a translation of an earth-centered coordinate system represented by $(X_0, Y_0, Z_0)$ such that an orbital arc segment of interest lies in a plane, substantially parallel to the cardinal plane, represented by X-Z, in the directional cosine coordinate system of the antenna system, represented by (X, Y, Z). The plurality of fixed delay line lengths is operable to cause the antenna system to launch an electromagnetic energy beam which is squinted by a predetermined amount towards the orbital arc segment of interest. Multiple beams are optionally formed to communicate with multiple satellites located in GEO orbit simultaneously by adding additional phase shifters at each column and corresponding beamformers. However, the plurality of line lengths remains the same, that is, independent of the number of beams. Each phase shifter of the plurality of M phase shifters is operable to introduce a plurality of phase shifts to the respective-column in response to a corresponding plurality of control signals to direct the electromagnetic energy beam to a corresponding plurality of predetermined points on the orbital arc segment. The antenna system comprises a phase shift controller operable to generate the plurality of control signals to direct selectively the electromagnetic energy beam to a desired point of the plurality of predetermined points on the orbital arc segment. A number of the at least one fixed electronic squint is selected. Lengths of the total plurality of fixed delay line lengths for the planar array are generated based on the number of the at least one fixed electronic squint. All of the antenna elements in the planar array for the mobile earth station are fitted with the generated lengths. The orbital arc segment around the earth is electronically scanned with a single linear scan with the planar array.

Optionally, the number of the at least one fixed electronic squint is one, wherein the mobile earth station is operable to communicate with a geostationary satellite located on the orbital arc segment. Beam pointing error of the planar array is calculated over the plurality of longitudes and the plurality of latitudes, as the mobile earth station communicates with the geostationary satellite by calculating a difference between the cardinal plane of the antenna system, after optimizing an orientation of the antenna system, and the orbital arc segment as the orbital arc segment is mapped onto the directional cosine coordinate system of the antenna system for the plurality of latitudes and the plurality of longitudes. A maximum squint required to minimize the beam pointing error is calculated. A temporary fixed squint value for a squint is defined as a fraction of the maximum electronic squint. The antenna system is oriented such that the beam pointing error is minimized over the plurality of latitudes and the plurality of longitudes for the temporary fixed squint value. A temporary beam pointing error is set equal to the beam pointing error calculated using the temporary fixed squint value. The squint is adjusted by an increment to generate a new squint value. The antenna system is re-oriented for the new squint value for the plurality of latitudes and the plurality of longitudes. A new beam pointing error is calculated. The new beam pointing error is compared to the initial beam pointing error and if the new beam pointing error is smaller than the temporary beam pointing error, a final squint value is set to the new squint value; otherwise the final squint value is set as the temporary squint value. The adjusting a squint by an increment to generate a new squint value, said re-orienting the antenna system for the new squint value for the plurality of latitudes and the plurality of longitudes, said calculating a new beam pointing error, and said comparing the new beam pointing error to the initial beam pointing error and if the new beam pointing error is smaller than the previous beam pointing error, setting a final squint value to the new squint value, otherwise setting the final squint value as the temporary squint value, is repeated until the temporary beam pointing error is minimized for the final squint value for the plurality of latitudes and the plurality of longitudes, wherein the generating lengths of the plurality of fixed delay line lengths for the planar array based on the number of the at least one fixed electronic squint comprises generating lengths of the plurality of fixed delay line lengths based on the final squint value for all of the antenna elements of the planar array.

Optionally, the number of the at least one fixed electronic squint is two, wherein the mobile earth station is operable to communicate with a geostationary satellite located on the orbital arc segment, wherein the total plurality of fixed delay line lengths comprises a first plurality of fixed delay line lengths and a second plurality of fixed delay line lengths. Beam pointing error of the planar array is calculated over the plurality of longitudes and the plurality of latitudes, as the mobile earth station communicates with the geostationary satellite by calculating a difference between the cardinal plane of the antenna system, after optimizing an orientation of the antenna system, and the orbital arc segment as the orbital arc segment is mapped onto the directional cosine coordinate system of the antenna system for the plurality of latitudes and the plurality of longitudes. A maximum electronic squint required to minimize the beam pointing error is calculated. A first half of the maximum electronic squint is defined as a range of squints defined by a value of zero and half of the value of the maximum electronic squint. A second half of the maximum electronic squint is defined as a range of squints defined by half of the value of the maximum electronic squint and the value of the maximum electronic squint. A first temporary squint value is selected from the first half of maximum electronic squint and a second temporary squint value is selected from the second half of maximum electronic squint. A defined latitude is defined where the planar array requires half of the maximum electronic squint. The first temporary squint value is used to calculate the first plurality of line lengths for when the mobile earth station is at a latitude south of the defined latitude in a northern hemisphere and north of the defined latitude in a southern hemisphere, and the second temporary squint value is used to calculate the second plurality of line lengths for when the mobile earth station is at a latitude north of the defined latitude in the northern hemisphere and south of the defined latitude in the southern hemisphere.

The using the first temporary squint value to calculate the first plurality of line lengths for when the mobile earth station is at a latitude south of the defined latitude in the northern hemisphere and north of the defined latitude in the southern hemisphere comprises the following. The antenna system is oriented such that a first beam pointing error is minimized over the plurality of latitudes and the plurality of longitudes for the first temporary fixed squint value. A temporary first beam pointing error is set equal to the first beam pointing error calculated using the first temporary fixed squint value. The squint is adjusted by an increment to generate a new first squint value. The antenna system is re-oriented for the new squint value for the plurality of latitudes and the plurality of longitudes south of the defined latitude in the northern hemisphere and north of the defined latitude in the southern hemisphere. A new first beam pointing error is calculated. The new first beam pointing error is compared to the temporary first beam pointing error and if the new first beam pointing error is smaller than the temporary first beam pointing error, a final first squint value is set to the new first squint value; otherwise the final first squint value is set as the temporary first squint value. The adjusting the squint by an increment to generate a new first squint value; re-orienting the antenna system for the new squint value for the plurality of latitudes and the plurality of longitudes; calculating a new first beam pointing error; and comparing the new first beam pointing error to the temporary first beam pointing error and if the new first beam pointing error is smaller than the temporary first beam pointing error, setting a final first squint value to the new first squint value, otherwise setting the final first squint value as the temporary first squint value, is repeated until the temporary first beam pointing error is minimized for the final first squint value for the plurality of latitudes and the plurality of longitudes south of the defined latitude in the northern hemisphere and north of the defined latitude in the southern hemisphere. The generating lengths of the plurality of fixed delay line lengths for the planar array based on the number of the at least one fixed electronic squint comprises generating lengths of the plurality of fixed delay line lengths based on the final first squint value for all of the antenna elements of the planar array.

The using the second temporary squint value to calculate the second plurality of line lengths for when the mobile earth station is at a latitude north of the defined latitude in the northern hemisphere and south of the defined latitude in the southern hemisphere comprises the following. The antenna system is oriented such that a second beam pointing error is minimized over the plurality of latitudes and the plurality of longitudes for the second temporary fixed squint value. A temporary second beam pointing error is set equal to the second beam pointing error calculated using the second temporary fixed squint value. The squint is adjusted by an increment to generate a new second squint value. The antenna system is re-oriented for the new squint value for the plurality of latitudes and the plurality of longitudes. A new second beam pointing error is calculated. The new second beam pointing error is compared to the temporary second beam pointing error and if the new second beam pointing error is smaller than the temporary second beam pointing error, a final second squint value is set to the new second squint value; otherwise the final second squint value is set as the temporary second squint value. The adjusting the squint by an increment to generate a new second squint value; re-orienting the antenna system for the new squint value for the plurality of latitudes and the plurality of longitudes north of the defined latitude in the northern hemisphere and south of the defined latitude in the southern hemisphere; calculating a new second beam pointing error; comparing the new second beam pointing error to the temporary second beam pointing error and if the new second beam pointing error is smaller than the temporary second beam pointing error, setting a final second squint value to the new second squint value, otherwise setting the final second squint value as the temporary second squint value, is repeated until the temporary second beam pointing error is minimized for the final second squint value for the plurality of latitudes and the plurality of longitudes north of the defined latitude in the northern hemisphere and south of the defined latitude in the southern hemisphere. The generating lengths of the plurality of fixed delay line lengths for the planar array based on the number of the at least one fixed electronic squint comprises generating lengths of the plurality of fixed delay line lengths based on the final second squint value for all of the antenna elements of the planar array.

Optionally, the selecting a number of the fixed electronic squints comprises selecting a number greater than two based on a required minimum beam pointing error.

Optionally, the plurality of latitudes comprises a range of 70° latitude north to 70° latitude south, the plurality of longitudes comprising a 60° geostationary arc, the maximum electronic squint value being 8.04°, the final fixed squint being 3.675°.

Optionally, the plurality of latitudes comprises a range of 70° latitude north to 70° latitude south, the plurality of longitudes comprising a 60° geostationary arc, the maximum electronic squint value being 8.04°, the first final squint value being 1.88°, the second final squint value being 5.78°. Optionally, this method embodiment further comprises the following. The planar antenna array is switched to connect the first plurality of line lengths (corresponding to 1.88° squint value) to the plurality of antenna elements, if the location of the mobile earth station is at a latitude south of 26.38° in the northern hemisphere or at a latitude north of 26.38° in the southern hemisphere. The planar antenna array is switched to connect the second plurality of line lengths (corresponding to 5.78° squint value) to the plurality of antenna elements, if the location of the mobile earth station is at a latitude north of 26.38° in the northern hemisphere or at a latitude south of 26.38° in the southern hemisphere.

In an embodiment of the invention, a single broadband multibeam planar array in a mobile earth station is used to communicate with several GEO satellites simultaneously by generating multiple beams which need to be scanned only in one plane. Such an embodiment requires only M instead of NM phase shifters for each beam and uses, for example, only one or two fixed (or hard-wired) squints in the orthogonal plane, depending on the application requirements. This approach significantly reduces array complexity and cost as compared to the conventional NM phase shifters approach.

BEST MODE FOR CARRYING OUT THE INVENTION

Figure 1:
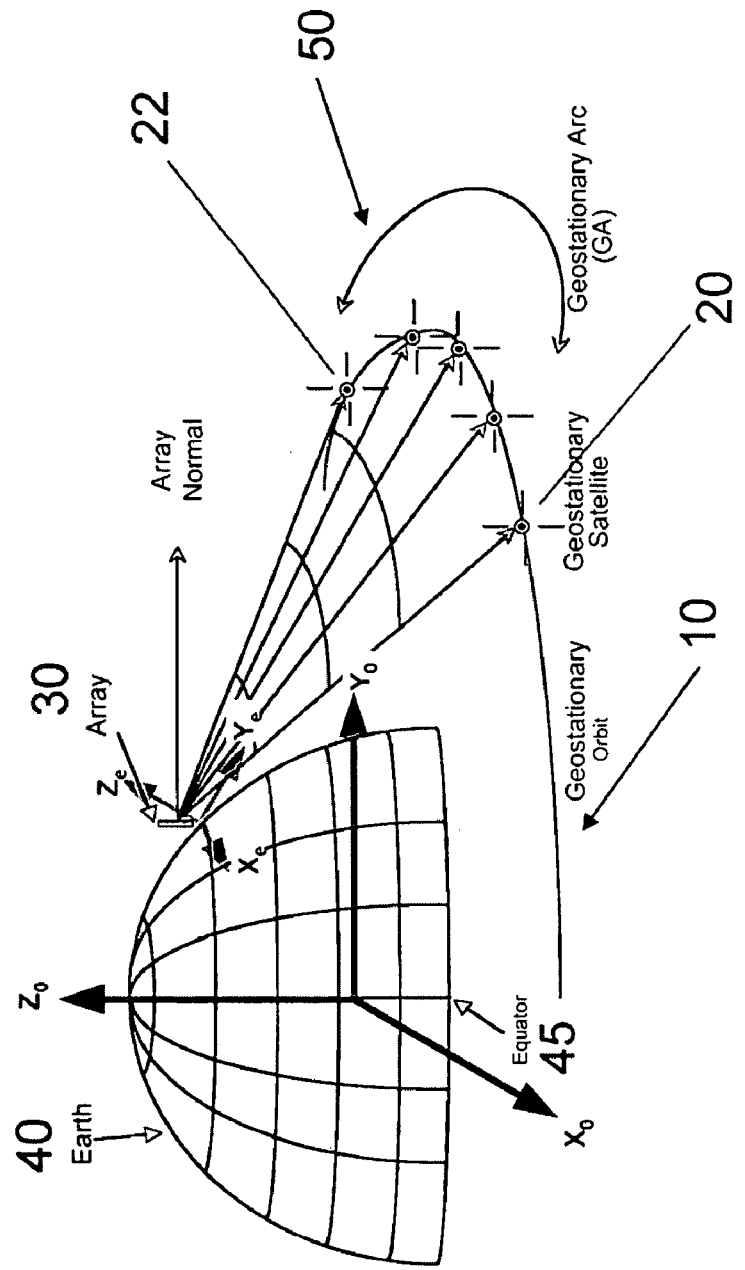
FIG. 1 is a perspective view of the Earth, an illustrative mobile earth station antenna and an illustrative GEO satellite geometry.
Figure 2:
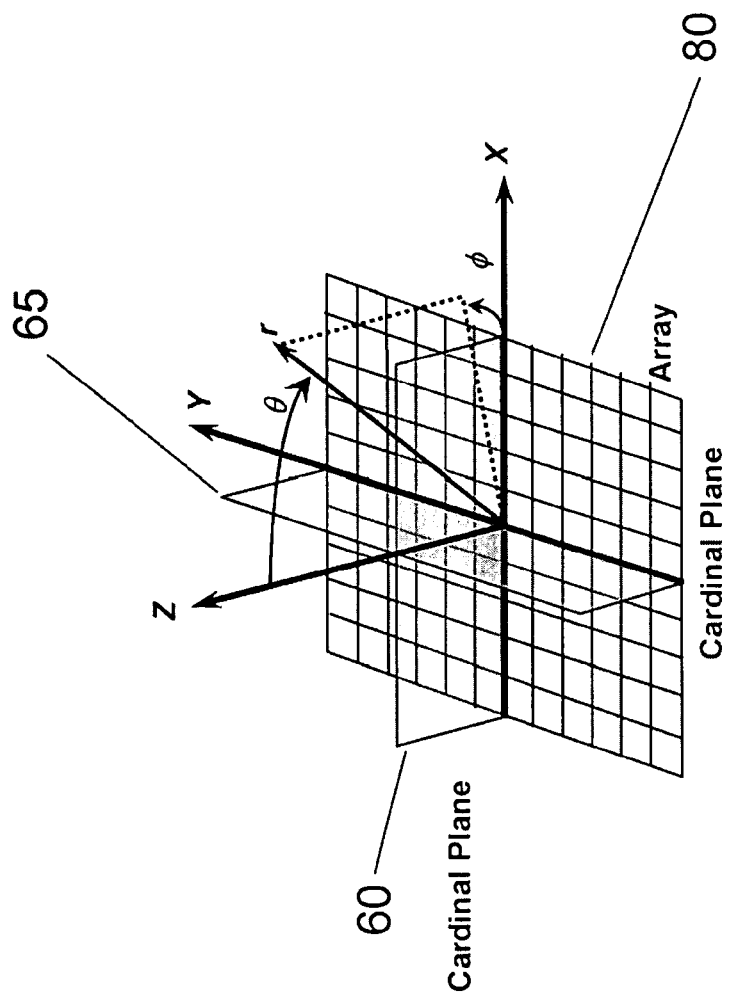
FIG. 2 is an illustrative graph of rectangular array cardinal planes.

A user of communications satellite services often communicates with multiple satellites in GEO orbit 10 simultaneously. To track a GEO satellite 20 accurately with a planar array 30 for an antenna system on the earth 40, the phases of each element in the array must be controlled, which calls for a very complicated phase control system especially for a large array. Since many of the satellites 20, 22 that most users communicate with are in the GEO orbit 10, a planar array that scans the beam only in one plane can be used if the satellites are located in the cardinal plane of the array's sin θ space (directional cosine coordinate system). The geometry of the problem is depicted in FIG. 1. FIG. 2 shows that the cardinal planes 60, 65 of a planar array, whose elements are located on a rectangular grid, are simply the X and Y axis of the array 80. So, if the Y axis is the vertical axis of the array in FIG. 1 then an embodiment of the invention, for example, will only scan the beam in the X-Z (or horizontal) plane of the array. FIG. 1 defines an orbital arc segment 50 of the GEO orbit 10 as the GEO arc (GA). This arc can be either the part of the GEO orbit 10 the mobile earth station needs to scan or the only part that is visible from the mobile earth station. In either case, only the satellites located in the GA are of interest.

For example, if there were only two satellites 20, 22 in the GA then the mobile earth station antenna could be mechanically positioned such that these two satellites lie in the array's cardinal plane. For three or more satellites, for example, the geometry is more complicated. However, if the GA, within which these satellites are located, lies very close (e.g., within the vertical half-power beamwidth of the array) to a plane parallel to the array's cardinal plane then simple one-dimensional scanning can be used to track the satellites.

Figure 3:
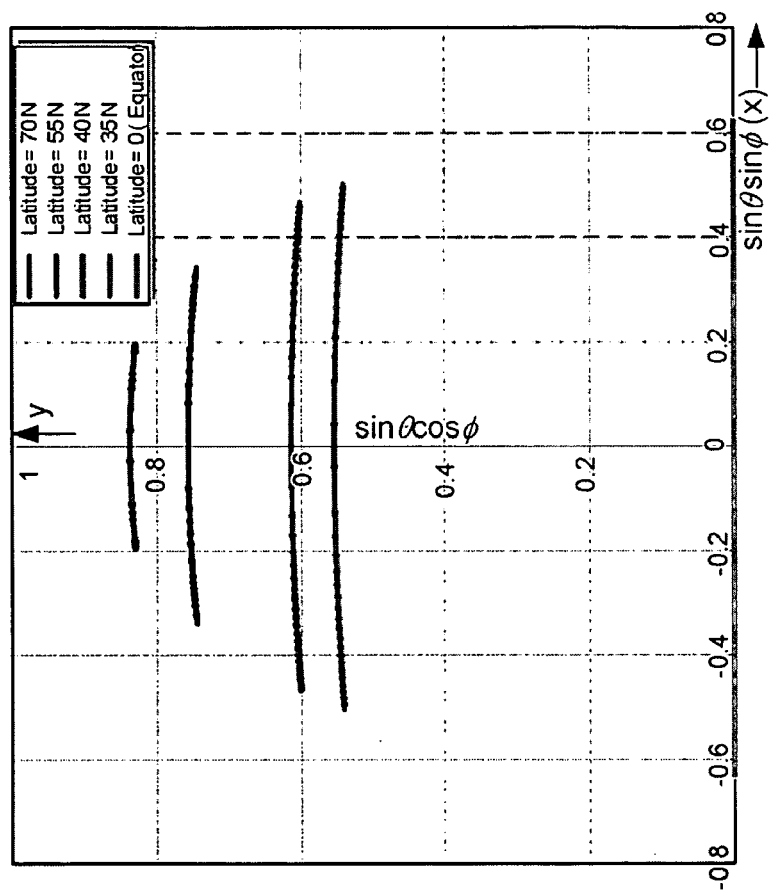
FIG. 3 is a graph mapping a 60° geostationary arc onto the cardinal planes of an array located at various latitudes and center longitude of the 60° geostationary arc.

If the mobile earth station (as shown symbolically as the array 30 in FIG. 1) is on the equator 45, the GA can be mapped exactly onto the array's cardinal plane (X-Z plane). However, as the mobile earth station moves away from the equator 45 toward the poles, one can only approximately map the GA onto a plane parallel to a cardinal plane. As an example, the mapping of a 60° GA onto the directional cosine coordinates of an array located at various latitudes and center longitude of the 60° GA is shown in FIG. 3. The array is positioned as shown in FIG. 1; array normal is not pointing toward the GA. The abscissa and ordinate in FIG. 3 are the array cardinal planes 60, 65. Since the abscissa and ordinate values for mapped curves of GA are far away from the cardinal planes 60, 65 for mobile earth station locations away from the equator 45, the array 30 will need to scan the beam in both planes to cover the GA from different latitudes.

Figure 4:
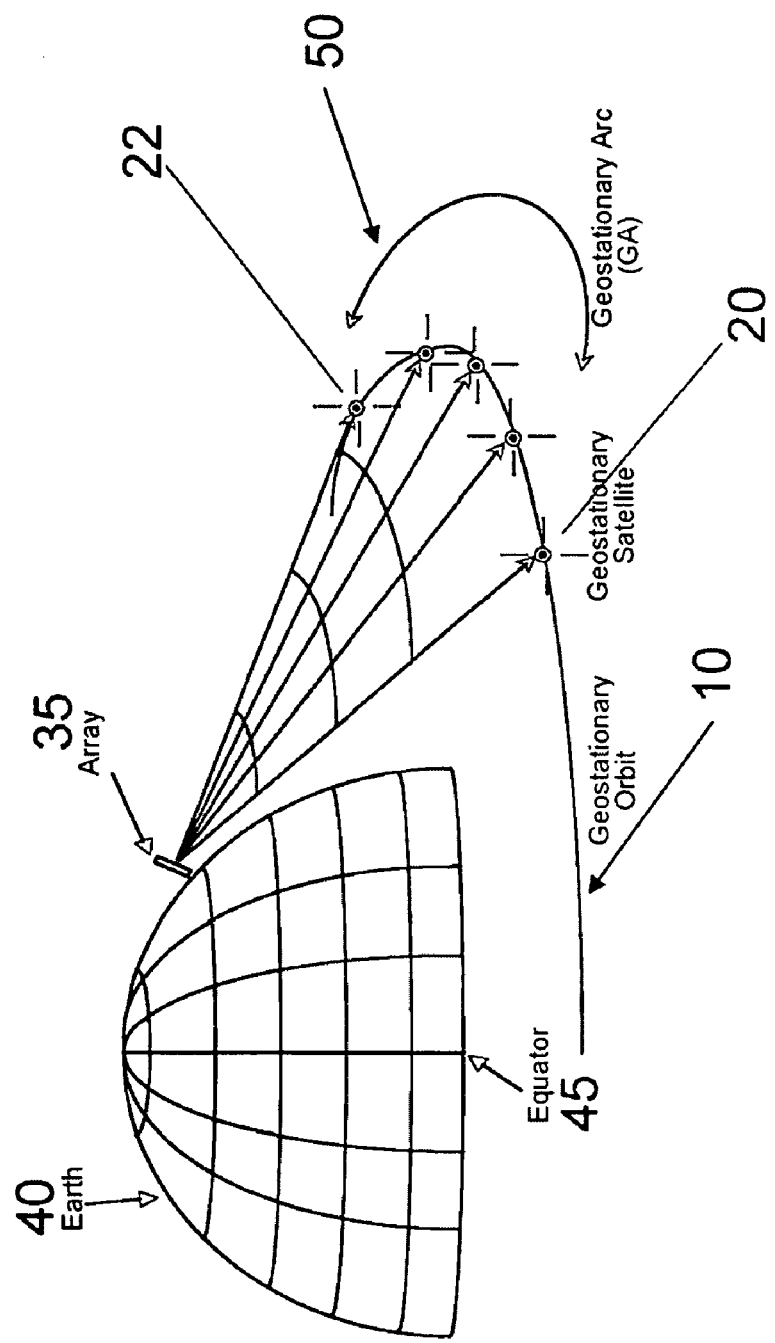
FIG. 4 is a perspective view of a mobile earth station antenna tilted to cover a geostationary arc.
Figure 5:
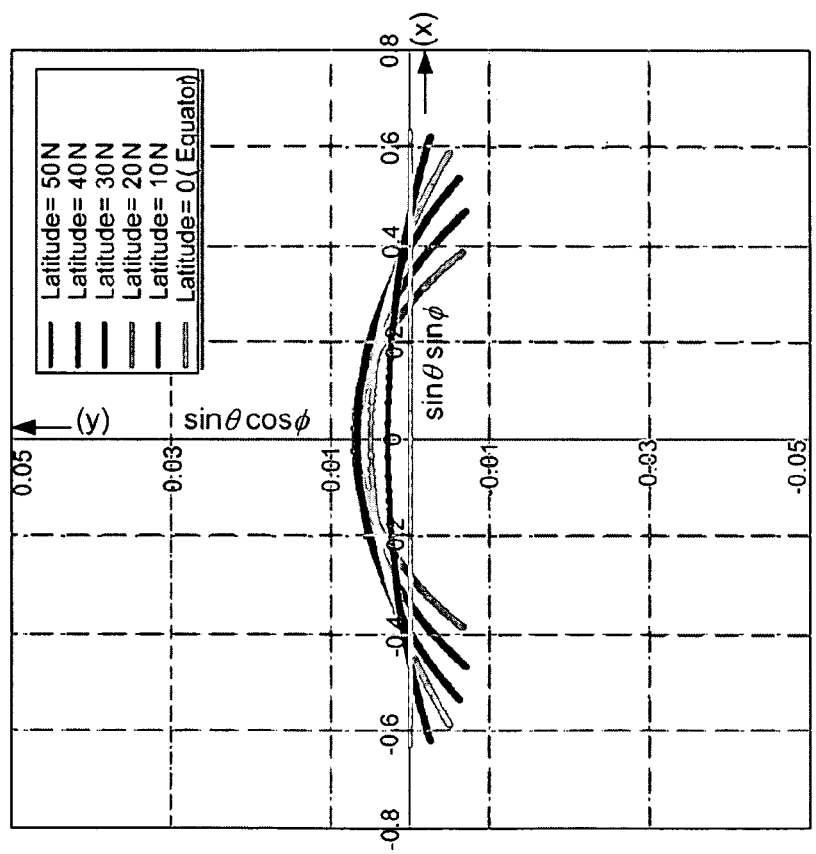
FIG. 5 is a graph of optimum mapping of a 60° geostationary arc (using only mechanical tilt) onto the cardinal planes of an array located at several latitudes and center longitude of the 60° geostationary arc.
Figure 6:
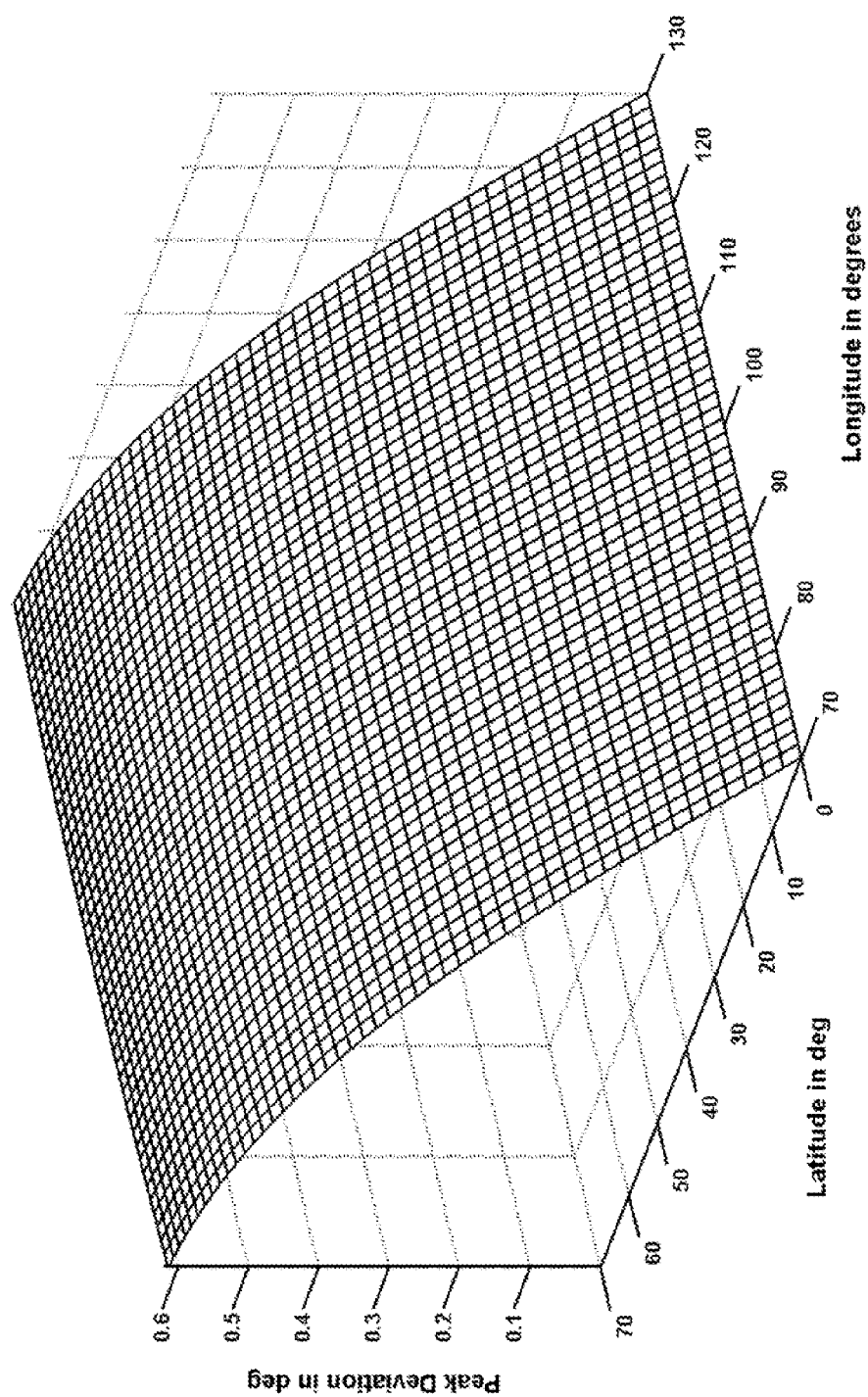
FIG. 6 is a graph of array beam pointing error as a function of the mobile earth station's longitude and latitude using only mechanical tilt.
Figure 7:
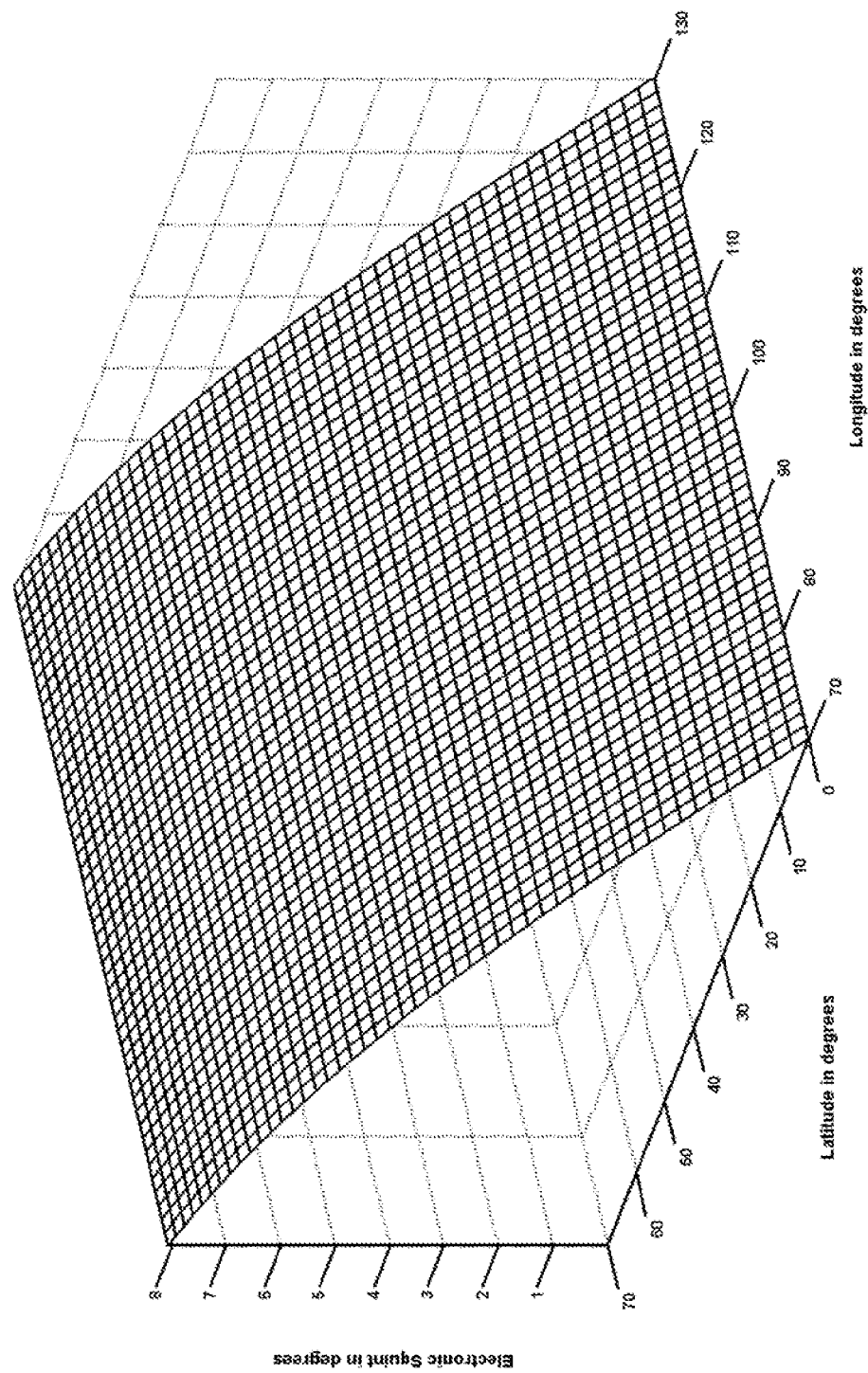
FIG. 7 is graph of required electronic squint for a range of mobile earth station locations (in terms of latitude and longitude).
Figure 8:
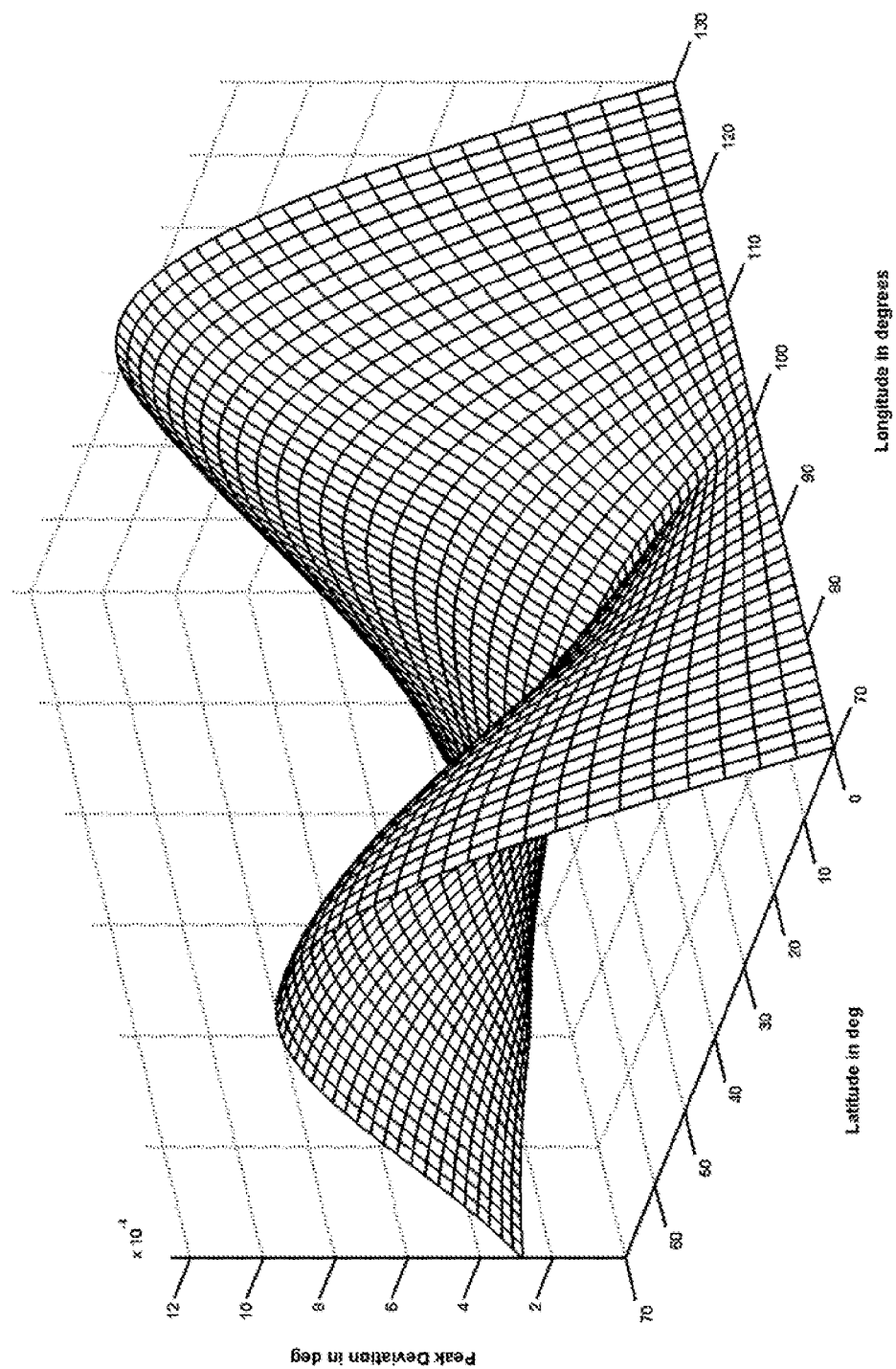
FIG. 8 is a graph of array beam pointing error for a range of mobile earth station locations when the electronic squint of FIG. 7 is implemented and array orientation is optimized.

If the array 35 were tilted such that the array normal points toward the GA, as shown in FIG. 4, then the mapped GA segment would lie very close to a plane parallel to a cardinal plane. The mapping of the same 60° GA onto the cardinal planes of a tilted array 35 is shown in FIG. 5, for mobile earth station location at various latitudes and center longitude of the 60° GA. Notice the change in the sin θ cos φ axis (Y-axis) scale compared to the scale in FIG. 3. In this example, the mapped curves of 60° GA deviate at most by 0.5° from a cardinal plane. If the antenna half-power beamwidth in the sin θ cos φ direction is at least twice the peak deviation (i.e., 2×0.5°=1°) then electronic scanning of the antenna beam would be needed only in the sin θ sin φ (orthogonal) direction to track the satellites with an acceptable tracking error for many applications. If the mobile earth station operated over a larger range of latitudes (beyond 50° North and 50° South) and larger than 60° GA segment, the deviation would be a bit larger than the value shown in FIG. 5. FIG. 6 shows peak deviation (i.e., main beam pointing error) for a 60° GA and 0-70° latitudes. For plots in this disclosure, our longitude varies from 70°-130° (60° GA) which refers to continental USA. However, the results presented here will apply for any 60° GA. Referring to FIG. 6, the beam pointing error (i.e., peak deviation), over the specified range of longitudes and latitudes of interest, is about ±0.6°. Referring to FIG. 5, if the beamwidth in the vertical plane is wide enough to cover this deviation without much loss in antenna gain, then the array needs to scan the beam only in the horizontal plane to communicate with all the satellites located in the 60° GA. This one-dimensional scanning, for example, reduces the complexity and cost associated with scanning of a planar array to that of a linear array. For very narrow beam antennas, even this small error may be too much. Amitay and Gans reported on a method to reduce this deviation further by replacing the mechanical tilting of the array by electronically squinting the beam away from broadside in the vertical plane with fixed linear phase taper and optimizing the array orientation. In the horizontal plane, a variable linear phase shift would still be used to scan the beam. Results for specific earth station locations are provided in Table I of N. Amitay and M. J. Gans, "*Narrow Multibeam Satellite Ground Station Antenna Employing a Linear Array with a Geosynchronous Arc Coverage of 60°—Part I: Theory*", IEEE Transactions on Antennas and Propagation, Vol. AP-30, No. 6, pp. 1063-1067, November 1982. From that table, it is clear that the beam pointing errors were reduced to very small values using their optimization procedure. Using their approach, the maximum electronic squint needed was calculated as a function of the mobile earth station's longitude and latitude. This is shown in FIG. 7. By providing the needed squint and optimizing the array orientation, the beam pointing error, as stated before, can be reduced to a very small value. FIG. 8 shows this beam pointing error as a function of the mobile earth station's longitude and latitude. As noted from FIG. 8, the pointing error is very small (e.g., less than 0.0013°).

However, Amitay and Gans approach works well only if the electronic squint can be varied depending on the earth station location (i.e., its longitude and latitude). Having a capability of variable squint is akin to having a limited scan capability in that plane, which calls for new phase adjustments at each element whenever the earth station location changes. Amitay and Gans did not develop a simple solution for obtaining this variable squint. They proposed an antenna system containing a linear array of feed horns with bias cut apertures illuminating a pair of parabolic cylinder reflectors in M. J. Gans and N. Amitay, "*Narrow Multibeam Satellite Ground Station Antenna Array with a Geosynchronous Arc Coverage of 60°—Part II: Antenna Design*", IEEE Transactions on Antennas and Propagation, Vol. AP-31, No. 6, pp. 966-972, November 1983. Their antenna design will work only for a fixed (not mobile) earth station.

By way of contrast, an embodiment of the invention includes a single planar array (with one or two fixed squints) that can be used on a mobile earth station to communicate with one or more GEO satellites simultaneously. The array, for example, generates multiple beams which need to be scanned only in one plane (i.e., the array needs only M instead of NM phase shifters for each beam) along with one or two (e.g., depending on the beamwidth and other requirements) fixed (or hard-wired) squints in the orthogonal plane. This approach, for example, reduces complexity and cost significantly by reducing the number of phase shifters by a factor of N.

Figure 9:
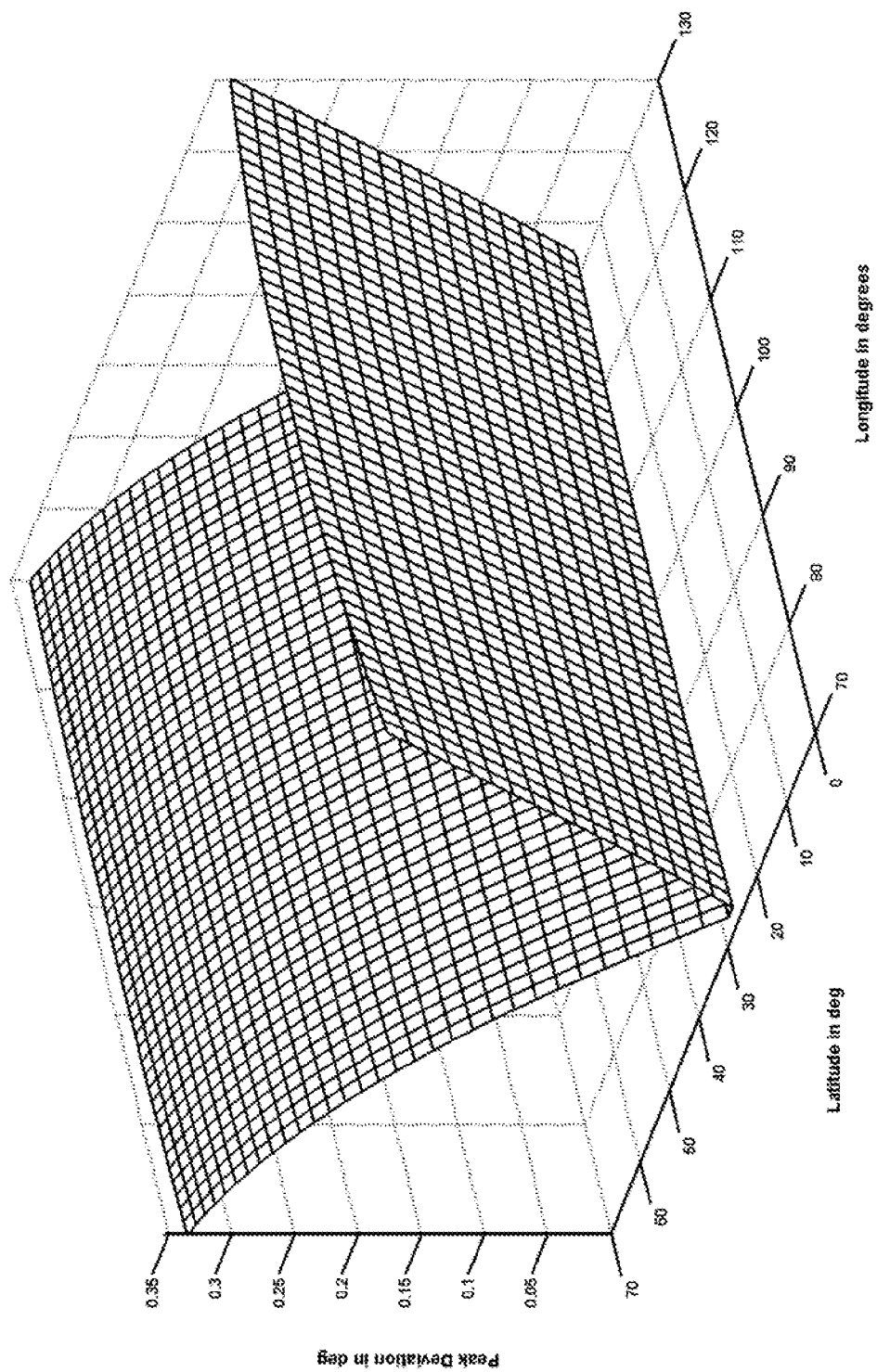
FIG. 9 is a graph of array beam pointing error for a range of mobile earth station locations when only one fixed (or hard-wired) squint of 3.675° is implemented and array orientation is optimized.

From FIG. 7, it is clear that the amount of variable electronic squint needed varied from 0° to 8.04°. Instead of using a variable squint, in an embodiment of the invention, a fixed electronic squint for all mobile earth station locations is used. The initial value of the fixed squint was chosen as 4° (i.e., one half of 8.04°). The Amitay and Gans optimization procedure was used to determine the optimum array orientation to minimize the beam pointing error over the range of latitudes and longitudes of interest. The fixed squint was then varied by small increments (e.g., 0.01°) from 4° and each time optimizing the array orientation until a minimum value for beam pointing error was obtained. The results are shown in FIG. 9. From FIG. 9, it is noted that a beam pointing error of 0.352° is obtained when a single fixed (or hard-wired) squint of 3.675° is used. This beam pointing error is much lower than the error of 0.6° noted in FIG. 6, which is for the case of no electronic squint (only mechanical tilt is used). Implementing a fixed squint is trivial. That is, only an additional length of transmission line (wherein the length of the transmission line depends on the location of the antenna element in the array) needs to be added at each antenna element when the array is constructed.

Figure 10:
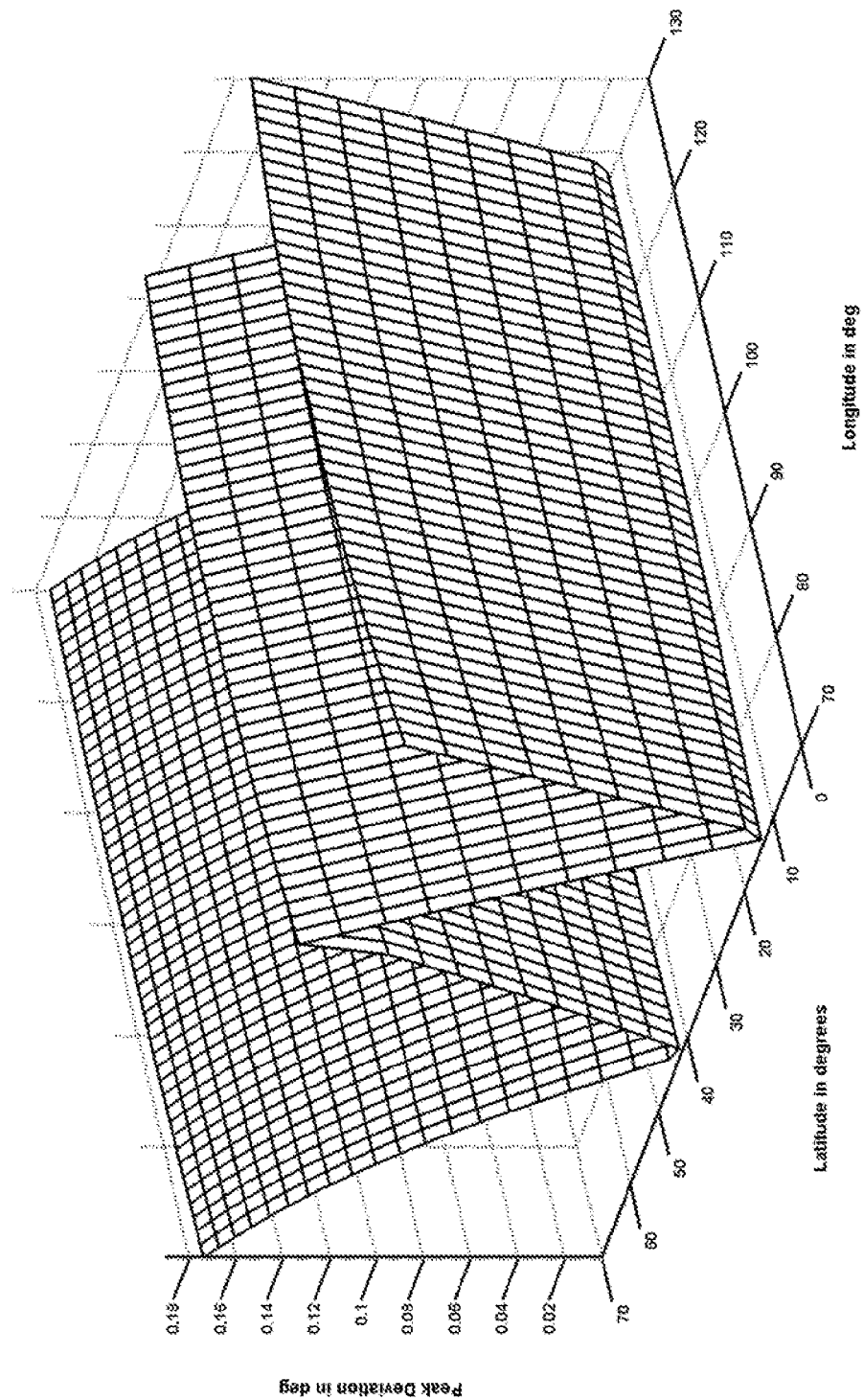
FIG. 10 is a graph of array beam pointing error for a range of mobile earth station locations when two fixed (or hard-wired) squints (5.78° and 1.88°) are implemented and array orientation is optimized.
Figure 11:
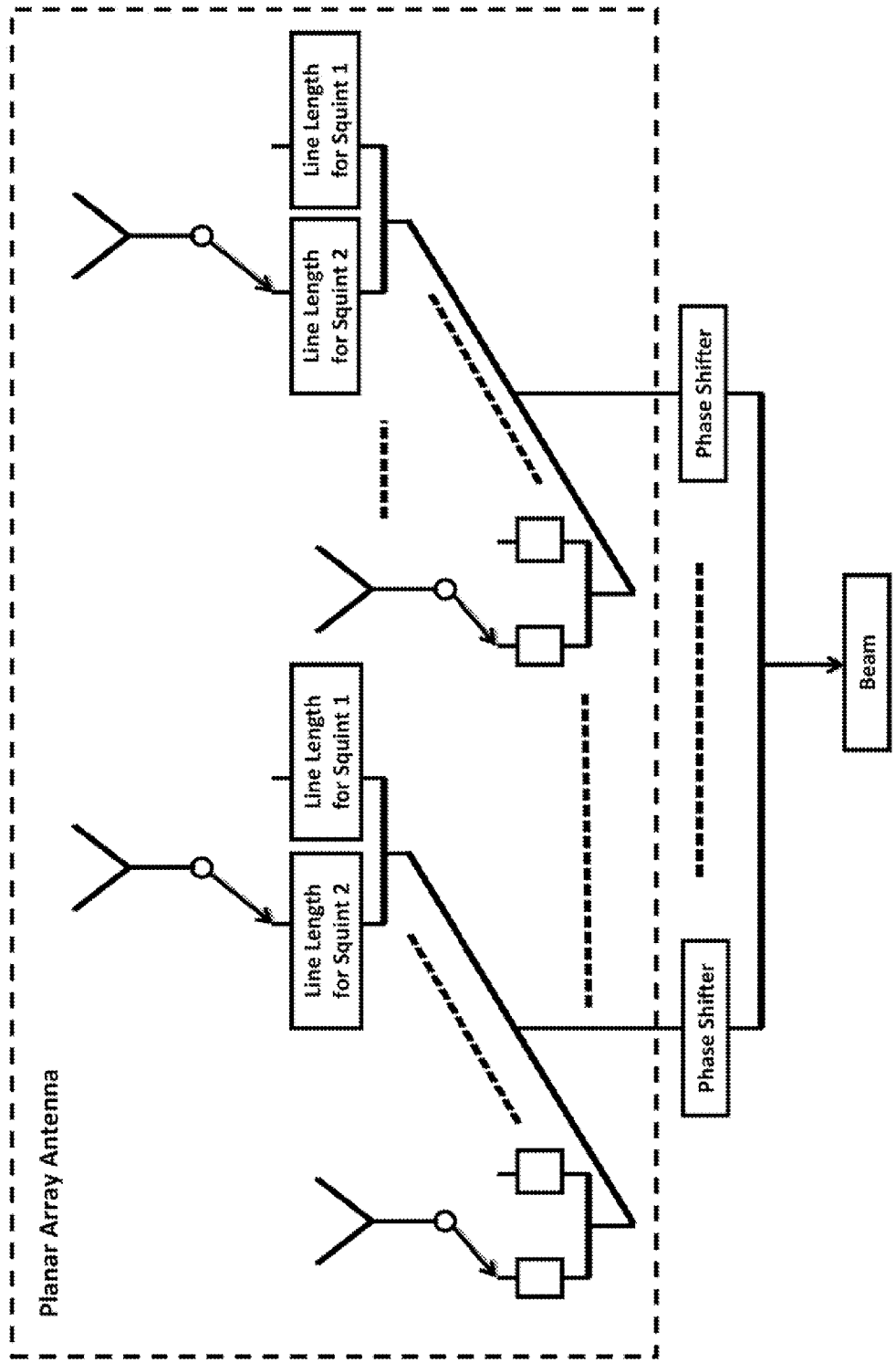
FIG. 11 is an illustrative embodiment of the instant invention.

In an alternative embodiment of the invention, if the beam pointing error of 0.352° is too large (e.g., for narrow beam applications), additional fixed squints are advantageously added. For example, FIG. 10 shows the beam pointing error when two fixed (or hard-wired) squints are used in an embodiment of the invention. The squint values of 5.78° and 1.88° are obtained by starting, for example, with 6° and 2° respectively and using a similar optimizing procedure described when only a single fixed squint was considered. From FIG. 10, it is noted that the pointing error is less than 0.18°. To implement two hard-wired squints, two separate additional lengths of transmission lines (wherein the respective length of the transmission lines depend on the element location) are used at each element and a switch is provided to select the correct transmission line depending on the latitude position of the mobile earth station. For latitudes south of 26.38° in the northern hemisphere, the embodiment of the invention uses the transmission lines corresponding to the fixed squint value of 1.88°. For latitudes north of 26.38° in the northern hemisphere, the embodiment of the invention uses the transmission lines corresponding to the fixed squint value of 5.78°.

In another embodiment of the invention, the beam pointing error is optionally further reduced by increasing the number of fixed squints. However, for the case of GEO satellites, one or at most two fixed squints are often sufficient if the earth station antenna beamwidth is wider than 1°.

Another embodiment of the invention is operable to form multiple beams for communicating with multiple satellites in the GEO orbit simultaneously by adding additional phase shifters at each column and corresponding beamformers. The number of fixed squints remains the same as they do not change with the number of beams that are formed by the phased array thereby reducing cost and complexity of the antenna.

Obviously, many modifications and variations of the instant invention are possible in light of the above teachings. It is therefore to be understood that the scope of the invention should be determined by referring to the following appended claims.

What is claimed is:

1. A method of electronically scanning with a single linear scan an orbital arc segment around the earth with a planar array of antenna elements on a mobile earth station, which moves between the equator and the poles, the planar array of antenna elements comprising a plurality of rows and a plurality of columns, the method comprising:

providing one optimum fixed electronic squint optimized based on a range of longitudes and latitudes covered by the mobile earth station, the one optimum fixed electronic squint minimizing a maximum beam pointing error for the range of longitudes and latitudes;

determining transmission line lengths for each antenna element in the planar array based on the one optimum fixed electronic squint;

adding the determined transmission line lengths to each of the antenna elements in the planar array; and electronically scanning the orbital arc segment with a single linear scan by the planar array using a phase shifter at each column of the planar array as the mobile earth station moves between the equator and the poles.

2. The method according to claim 1, wherein the mobile earth station moves within a longitudinal range of 60°, which corresponds to a 60° geostationary arc and within a latitudinal range from 70° N to 70° S an optimum fixed squint value being 3.675°, when utilizing the one optimum fixed electronic squint which minimizes the maximum beam pointing error, the maximum beam pointing error being 0.352°.

3. A method of electronically scanning with a single linear scan an orbital arc segment around the earth with a planar array of antenna elements on a mobile earth station, which moves between the equator and the poles, the planar array of antenna elements comprising a plurality of rows and a plurality of columns, the method comprising:

providing two optimum fixed electronic squints, each squint being optimized based on a respective range of longitudes and latitudes covered by the mobile earth station, the two optimum fixed electronic squints minimizing a maximum beam pointing error for the respective range of longitudes and latitudes;

determining a first plurality of transmission line lengths and a second plurality of transmission line lengths for each antenna element in the planar array based on the two optimum fixed electronic squints;

associating the first plurality of transmission line lengths and the second plurality of transmission line lengths to the antenna elements in the planar array and selectively coupling one of the first plurality of transmission line lengths and the second plurality of transmission line lengths by using a switch at each antenna element on the basis of longitude and latitude; and electronically scanning the orbital arc segment with a single linear scan by the planar array using a phase shifter at each column of the planar array as the mobile earth station moves between the equator and the poles.

4. The method according to claim 3, wherein the mobile earth station moves within a longitudinal range of 60°, which corresponds to a 60° geostationary arc, and within a latitudinal range from 70° N to 70° S, a first optimum fixed squint value being 1.88°, a second optimum fixed squint value being 5.78°, a maximum beam pointing error of 0.18°, the first optimum fixed squint value being used when the mobile earth station is located between 26.38° N and 26.38° S, the second optimum fixed squint value being used when the mobile earth station is located at one of a latitude north of 26.38° N and at a latitude south of 26.38° S.

5. A method of electronically scanning with a single linear scan an orbital arc segment around the earth with a planar array of antenna elements on a mobile earth station, which moves between the equator and the poles, the planar array of antenna elements comprising a plurality of rows and a plurality of columns, the method comprising:

providing at least two optimum fixed electronic squints optimized based on a range of longitudes and latitudes covered by the mobile earth station, the at least two optimum fixed electronic squints minimizing a maximum beam pointing error;

determining at least two pluralities of transmission line lengths for each antenna element in the planar array based on the at least two optimum fixed electronic squints;

adding the at least two pluralities of transmission line lengths to the antenna elements in the planar array and selecting one plurality of transmission line lengths of the at least two pluralities of transmission line lengths by using a switch at each antenna element; and electronically scanning the orbital arc segment with a single linear scan by the planar array using a phase shifter at each column of the planar array as the mobile earth station moves between the equator and the poles.

* * * * *